United States Patent [19]
Simmons et al.

[11] 3,758,938
[45] Sept. 18, 1973

[54] TOOL FOR APPLYING AND LOCKING THREADED FASTENERS AND METHOD

[75] Inventors: Roger Cleary Simmons, Shaker Heights; Horace Edward Boyd, Euclid; Peter Mathis Kuchling, Cleveland Heights, all of Ohio

[73] Assignee: Cooper Industries, Inc., Houston, Tex.

[22] Filed: Nov. 3, 1971

[21] Appl. No.: 195,164

[52] U.S. Cl. .................. 29/400, 29/200 B, 29/240, 29/521, 81/10
[51] Int. Cl. ... B23p 17/00, B23p 19/00, B23p 11/00
[58] Field of Search ............. 29/400, 400 R, 400 D, 29/200 B, 200 R, 521, 240; 81/10

[56] References Cited
UNITED STATES PATENTS
3,479,714  11/1969  Allsop .............................. 29/200 B

*Primary Examiner*—Thomas H. Eager
*Attorney*—Carl F. Schaffer et al.

[57] ABSTRACT

A power driven tool and method for turning a conventional threaded fastener on a threaded shank to a predetermined tightness and automatically locking it in place by deforming or swaging the fastener to create controlled thread interference. The tool includes a power driven fastener socket surrounded by a plurality of radially movable punches which, when moved inwardly, will deform the fastener to effectively lock it in place. The punches are caused to move inwardly upon the fastener by a mechanism for converting rotary motion of the tool to a radial clamping force which is applied to the fastener as it begins to be tightened and which is effective to deform the fastener after it has reached a predetermined tightness. The tool also includes means to automatically retract the punches from the fastener after the fastener has been deformed to permit removal of the tool.

15 Claims, 6 Drawing Figures

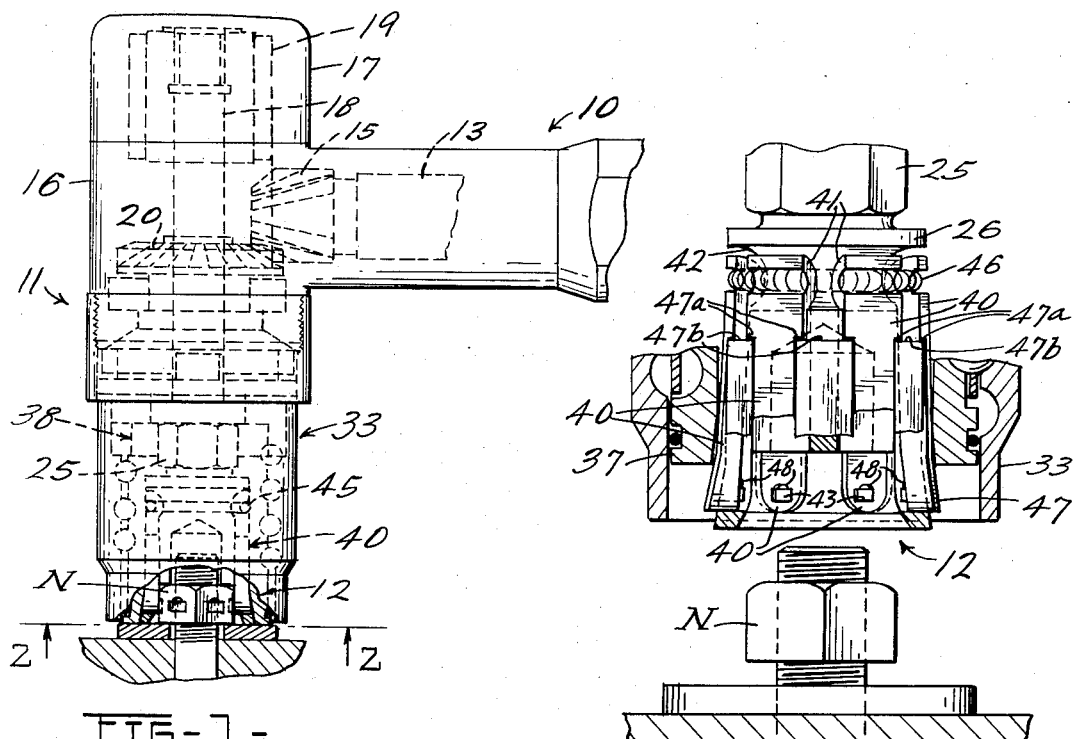
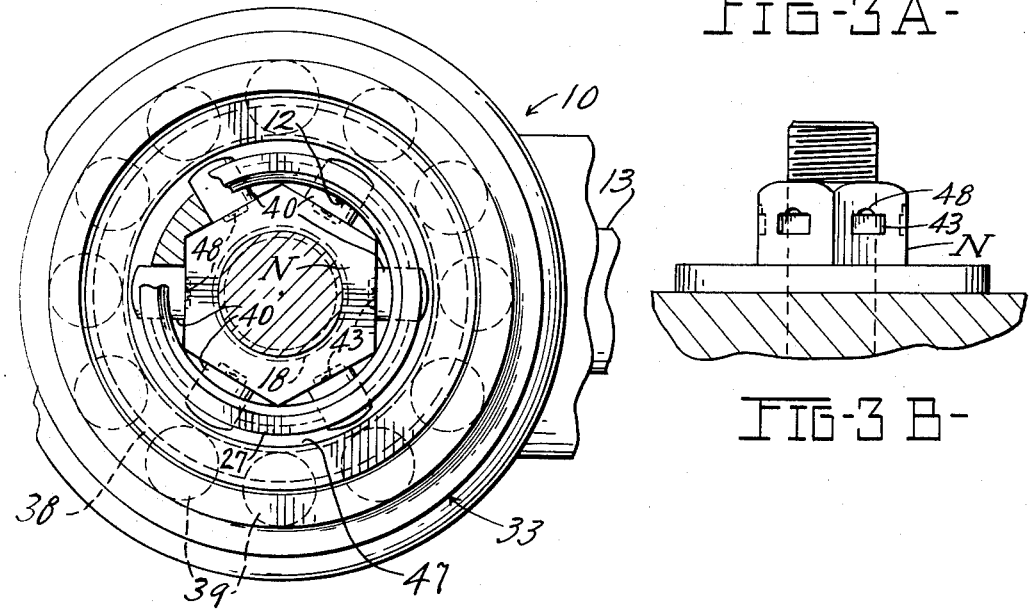
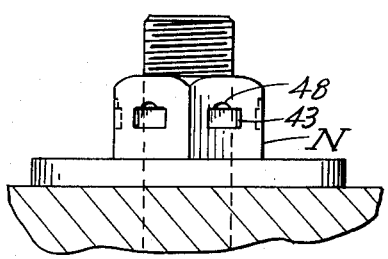

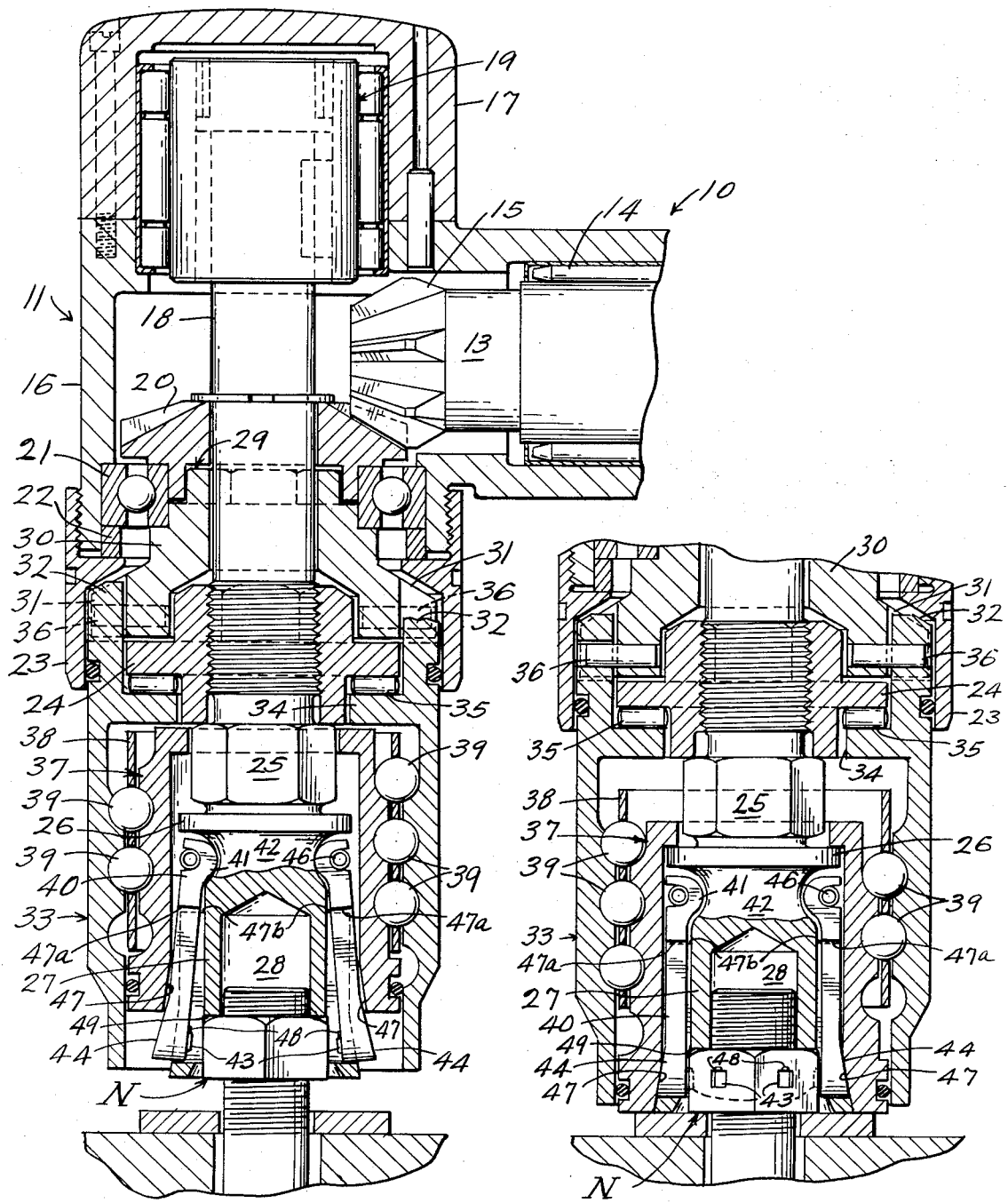

TOOL FOR APPLYING AND LOCKING THREADED FASTENERS AND METHOD

BACKGROUND OF THE INVENTION

There are in the prior art many forms of lock nuts, lock washers, and combinations thereof for preventing the unintentional loosening of a nut threaded upon a bolt or stud. In most cases, the threads of such devices are deformed during their manufacutre so that they do not perfectly mate or run freely upon the correspondingly threaded piece. Such fasteners are known in the art as "prevailing torque" nuts which have a prime disadvantage in that their application is limited to slow assembly and requires an added amount of applied torque, as compared to a standard nut which can be rapidly applied by hand or with a power tool, until it reaches the position where it begins to clamp the two members together. In addition, such prevailing torque nuts are relatively expensive and the amount of prevailing torque is difficult to control for a given series of nuts.

To overcome these disadvantages, there have been several attempts to provide a system or tool for "post-deformation" of common threaded fasteners which can be quickly run down to the desired degree of tightness and then crimped or otherwise deformed to lock against loosening. Such post-deformation systems have utilized various means for deforming the threads exposed on the bolt above the nut or to deform the nut, after it has been threaded on the bolt. U.S. Pat. Nos. 1,925,714; 2,538,343; and 3,003,378 disclose devices designed to deform either the bolt or nut by repeatedly impacting it with a portion of a tool having a substantial mass. Such devices, particularly for a hand held tool, are necessarily quite bulky due to the mass required for effective impact, are noisy and are subject to wear and high maintenance costs.

Another impact device is disclosed in U.S. Pat. No. 3,479,714 in which a nut is deformed in a radial direction by impact members positioned adjacent the faces or flats of the nut. In this device, the impact energy is derived from the rotational energy applied to the driven nut socket but the same disadvantages of such impact type devices are present in that the tool is noisy, subject to wear, and must rely upon the judgment of the operator to indicate when the nut has been sufficiently deformed to create the thread interference necessary to lock it in place.

Another approach has been used to eliminate the disadvantages inherent in such impact devices. This approach is to use either a fluid or hydraulic force to urge the punches or clamps into the nut, after the nut has been tightened to a predetermined tightness by the driven nut socket. In this approach, fluid pressure, such as the air supply used to drive an air driven power wrench, can be used to move a piston which causes clamping jaws and punches carried thereby to radially deform the nut with a steady and uninterrupted force. U.S. Pat. No. 3,603,132 and co-pending application Ser. No. 38,168 filed May 18, 1970, now U.S. Pat. No. 3,646,837, assigned to the assignee of the present invention, both disclose pneumatically driven power tools which use fluid pressure to apply the deforming force to the sides or flats of the nut, after the nut has been driven to a predetermined tightness. While these tools eliminate some of the problems inherent with impact-type tools, they are somewhat slow in operation in that they require a shift from the application of rotary motion, after the nut has reached its predetermined tightness, to the application of a deforming force from the same source of fluid power. Also, with these latter devices, because of the fact that no deforming force is applied during the run down and initial tightening of the nut, the punches or clamps do not grip the nut until it has reached a predetermined tightness. Therefore it is possible for an operator using the tool to short circuit the proper operation thereof by removing it from the nut prior to the application of the clamping or deforming force, thus defeating the purpose of the tool and leaving the joint in unlocked condition. This undesired short circuit can also be caused by a malfunction of the valve which shifts these tools from their torquing to their crimping state.

It is accordingly an object of this invention to provide a dual purpose tool which automatically drives a threaded fastener to a predetermined tightness upon a correspondingly threaded shank, applies a clamping force upon the fastener during a portion of the driving period to prevent unwanted early removal of the tool, and automatically applies a deforming force upon the lateral faces or flats of the nut to lock it in place at the point of predetermined tightness. The present invention also includes the automatic release of the clamping jaws or punches from the threaded fastener after deformation has taken place so that the tool can be removed by the operator and thence quickly applied to the next fastener to be tightened and deformed.

SUMMARY OF THE INVENTION

The tool of this invention is a combination fluid power tool for driving a threaded fastener by means of a rotary socket placed over the fastener with means for converting the rotary motion of the tool to a crimping force applied to punches or clamps which are forced radially inwardly upon the lateral faces or flats of the nut to deform it upon the shank of the bolt or other member upon which the nut is threaded. In the preferred embodiment, a plurality of punches lie outside of the socket around the periphery of the nut and, when forced into closed position, extend through the socket into contact with the nut faces to deform them. The deforming movement of the punches is caused by the inner member of a ball screw which has its outside element rotatably driven directly by the fluid motor and its inside element coupled to the socket. Initial rotary movement imparted to the outside member will drive the socket via the ball screw elements and thus the nut to a position where the nut begins to tighten, at which time torque resistance of the nut will overcome the friction of the ball screw and cause relative rotary movement between the outside and inside members. This relative motion will cause the inside member to move downwardly, urging the punches inwardly against the faces of the nut. As soon as a predetermined torque or resistance against rotation is reached, further power from the motor will continue to turn the outer element of the ball screw relative to the inner member and socket. These members, however, no longer turn, so that all applied power now is used to cause further downward movement of the inside member and final deformation of the nut face. Upon reaching a predetermined resistance to further rotation of the outer member of the ball screw, caused by resistance of the nut to further deformation, a sensor in the tool will cause the fluid motor to automatically reverse. The socket and interior member of the ball screw are prevented from reverse rotation by a one-way clutch so that only the outer member will turn in reverse, thus raising the interior member of the ball screw and rapidly releasing the clamping members from the now deformed nut. Upon complete release, the tool will automatically return to its initial state to be ready for application to a subsequent fastener. Operation of a preferred embodiment and other objects and advantages of the instant invention will be apparent from the following detailed description.

DESCRIPTION OF THE DRAWINGS

FIG. 1 is a view in elevation of the front driving and crimping portion of the tool of this invention, showing it upon a threaded fastener in closed position;

FIG. 2 is a cross-sectional view, taken along line 2—2 of FIG. 1 and shown on an enlarged scale, illustrating the position of the deforming punches as they engage the threaded fastener;

FIG. 3a is a view in elevation on an enlarged scale showing the lower drive socket portion of the tool about to be placed upon a threaded fastener which has not yet been drawn into tight position;

FIG. 3b is a view similar to FIG. 3a but showing the nut as it appears after the tool has tightened the joint and applied the deforming force to the nut faces;

FIG. 4 is a view in elevation of the front drive end of the tool of this invention, showing the interior details of the drive and clamping mechanisms; and FIG. 5 is a view in elevation of a portion of the tool shown in FIG. 4, showing the position of the elements as they appear when they are clamped upon a nut in deforming position.

DESCRIPTION OF THE PREFERRED EMBODIMENT

The front end of the tool of this invention is generally shown in FIG. 1 and includes a body 10 whose rear portion (not shown) houses a rotary air motor, manual throttle valve, and other controls which do not form a part of this invention. At the other end of the body 10 is a head portion 11 at right angles thereto which houses a driven socket, generally designated by reference numeral 12, and the clamping mechanisms which will be later described in detail. Extending through the body 10 from the air motor is a drive shaft 13 which, as best seen in FIG. 4, is journalled for rotation in a conventional needle bearing 14 and terminates in a bevel pinion 15 extending into the head portion 11.

Referring to FIG. 4, the head portion 11 includes a hollow housing 16 integrally formed with the body 10 upon which is bolted a hollow head cap 17. Extending through the hollow housing 16 is a drive spindle 18 whose upper portion extends within a roller clutch 19 which is housed within the head cap 17. The housing of the roller clutch is secured relative to the head cap 17 with the movable clutch element in contact with the drive spindle 18 such that the clutch is used in a backstopping relationship, permitting the drive spindle 18 to turn freely in one direction and not to turn in the other direction. The clutch in this case permits the spindle to rotate in a clockwise direction, (looking downwardly upon the fastener in FIGS. 1 or 4), but not to turn in a counterclockwise direction. Roller clutches suitable for this purpose are available from a number of commercial sources including the Torrington Company, Bearings Division, Torrington, Conn. 06790.

The middle portion of the drive spindle 18 supports a bevel gear 20 which is freely rotatable relative to the drive spindle 18 and which is meshed with the bevel pinion 15. The bevel gear 20 is journalled for rotation upon a ball bearing 21 whose inner race supports the bevel gear 20 and whose outer race is secured between an internal flange on the housing 16 and a ring spacer 22 held in place by an external bearing retainer 23 which is threaded to the exterior edge of the housing 16.

The drive spindle 18 is threaded, splined or otherwise securely attached to a thrust nut 24 and extends through the thrust nut 24 to form a hexagonal shank 25 which terminates on its lower surface with a stop flange 26. Below the stop flange 26, the drive spindle 18 has a lower portion 27 which is counterbored with a hole 28 which is of sufficient diameter and depth to provide the necessary assembly bolt clearance for the end of the stud or bolt to which the nut is being applied. The lowermost end of the spindle forms the drive socket 12 which is hexagonally shaped to receive te nut.

The bevel gear 20, which is driven directly by the bevel pinion 15 integrally formed on the drive shaft 13, is connected by a hexagonal drive portion 29 to a complementarily shaped portion of a drive coupling 30 which also rotates with the inner race of the ball bearing 21. The lower outer periphery of the drive coupling 30 has a number of radial drive lugs 31 which interfit with upwardly projecting driven lugs 32 of a cylindrical member 33 which forms the lower exterior portion of the head portion 11 and which contains the clamping mechanism to be subsequently described. An interior flange 34 of the cylindrical member 33 rides on one side of an annular thrust bearing 35 which rides against the thrust nut 24. The cylindrical member 33 is held against axial movement by a plurality of pins 36 which extend through the upper portion of the cylindrical member 33 and the lower interfitting portion of the drive coupling 30. As thus far described, it will be seen that the cylindrical member 33 is turned by rotation of the bevel pinion 15 which in turn drives bevel gear 20, the drive coupling 30 and thence the cylindrical member 33 through the interlocking lugs 31 and 32.

Within the lower portion of the cylindrical member 33 is a ball screw which consists of an inner race 37, a ball cage 38 and a plurality of balls 39, along with the member 33 which acts as the outer race. As is well known to those skilled in the art, any relative rotary movement between the inner race 37 and the cylindrical member 33 which forms the outer race for the ball screw will result in relative axial movement between the two races 37 and 33. Because the outer race or cylindrical member 33 is fixedly axially relative to the rest of the tool, this relative axial movement will result in the inner race 37 moving downwardly or upwardly with respect to the rest of the tool.

It is this ball screw arrangement which is effective to convert the rotary motion imparted by the fluid motor to the radially directed inward force which is used to deform the faces of the nut. Placed within the interior of the inner race 37 is a plurality of levers 40 whose upper ends have arcuate portions 41 which rest against a relieved groove 42 in the spindle 18. In this preferred embodiment, as clearly seen in FIG. 2, there are six levers 40, equally spaced about the periphery of the socket 12, with each lever 40 having on the radially inner surface of its lower end a punch 43 which is the element to be driven into the face of the nut. The outer surfaces of the lower ends of the levers 40 have a wedge-shaped portion 44 while the upper ends have a groove 45 which cradles a circumjacent garter spring 46 which holds the punches in open position as shown in FIG. 4. On the inner surface of the lower edge of the inner race 37 of the ball screw is a tapered portion 47 which, when moved downward relative to the levers 40 and their punches 44, will wedge against the wedge-shaped portion 44 to move these levers 40 inwardly to a closed position, as shown in FIG. 5. Each of the levers 40 has a shoulder 47a which rests upon a ledge 47b on the spindle 18, as best seen in FIG. 4, to prevent downward motion of the levers 40 when they are being forced radially inward by the inner race 37.

Operation of the device will now be apparent from the above detailed description and is as follows. With the tool in starting position as shown in FIG. 4, the socket 12 is placed over a nut N with the end of the bolt extending into the hole 28 in the end of the spindle 18 and with the upper surface of the nut N resting upon a land 49 between the bore 28 and socket 12. In this position, the punches 43 remain retracted by the garter spring 46 so that the socket 12 can be applied to the nut N as easily as with a conventional tool. When the operator starts the fluid motor by manually opening the throttle valve, rotation of the spindle 18 and socket 12 through the bevel pinion 15, bevel gear 20 and the ball screw connection is initiated. Because there is negligible torque required to move the nut initially towards its ultimate tightened position, rotation of the entire ball screw mechanism occurs by driving the outer cylindrical member 33 in the manner previously described. At this stage of tightening, there is sufficient friction from the lubricant and drag of the ball screw components to turn the inner race 37 of the ball screw at the same rate as the outer race or cylindrical member 33 is driven. Rotary movement of the inner race 37 causes it to drive the spindle 18 through the hexagonal shank portion 20 and to thus turn the entire spindle 18, socket 12 and the locking levers 40 to run the nut up to a pretightening position.

As soon as some tightening torque is encountered, the resistance encountered by the socket 12 and spindle 18 will cause an initial amount of relative rotary movement between the inner race 37 and outer race or cylindrical member 33, causing the inner race 37 to move downwardly, Thus moving the punches 43 firmly into contact with the faces of the nut N. The nut threads are distorted in a radial direction to provide a predetermined elastic grip on the opposed mating bolt threads. This crimping force will increase as more resistance to rotation is encountered until finally the nut reaches a predetermined resistance to further rotation and the nut stops. Continued rotation of the outer race or cylindrical member 33 will cause further downward movement of the inner race 37 to drive all of the levers 40 inwardly, thus fully imbedding the punches 43 in the faces of the nut. In this position, as shown in FIGS. 2 and 5, the punches 43 completely penetrate the faces of the nut to distort the nut threads. It should be noted that, when the punches 43 are being driven into the nut, they are directly wedged therein by the wedge-shaped portion 44 on their tapered rear surfaces 47 as the contact area between these wedging surfaces has now moved down to a point directly opposite the punches 43. When full penetration has occurred, the relatively broad inner face of the levers 40 will strike the sides of the nut, thus stopping further penetration. At this time, the torque encountered by the fluid motor will rapidly increase and a torque responsive sensing device on the tool will respond and cause the motor to reverse. This sensing device can be a back pressure sensing valve for example, the valve described in U.S. Pat. No. 3,608,647.

As previously explained, reversal of the fluid motor will cause the ball screw mechanism to reverse its relative axial movement to release the punches from the nut. Loosening of the nut is prevented by operation of the roller clutch 19 which locks the pinion 18 against reverse rotation. This means that all force of the motor in reverse direction is used to turn the outer ball race or cylindrical member 33 in the opposite direction, thus causing the inner race 37 to rapidly move upwardly until it reaches its uppermost position shown in FIG. 4. At this time, the uppermost portion of the inner race 37 will strike the opposed surface of the interior flange 34 and stop. This will cause another sensor in the tool to shut off all power and return the tool to its original condition. Thus the tool is again ready in the position shown in FIG. 4 for use in driving and crimping another fastener.

It will be seen that because the crimping or deforming action is gradually applied to the nut N before rotary motion on the socket 12 is stopped, the tool is clamped upon the nut early in the cycle and cannot be removed until the tool has completely finished its crimping operation. This eliminates the undesirable possibility that the operator can short circuit the cycle by removing the tool prior to crimping being completed. A further indication of completion of the cycle in this preferred embodiment can be had by providing a telltale indication on the fully crimped nut. In addition to the general rectangular depression made by the punches 43, as shown in FIG. 3b, the punch may be provided with a shallow arcuate ridge 48 which will not strike the nut face or make an impression until penetration of the punch 43 itself is substantially complete. Thus referring to FIG. 3b, the impression made by this arcuate ridge 48 would not appear until the punch 43 has penetrated to substantially its desired depth. Thus if the tool has malfunctioned, the telltale indicator 48 would not appear on the deformed nut.

It will be apparent to those skilled in the art that other mechanisms such as a power translation screw with various threads can be substituted for the ball screw described in this preferred embodiment. Various other modifications of this preferred embodiment may be made without departing from the spirit and scope of the attached claims.

We claim:

1. A tool for applying and locking a threaded nut upon a threaded bolt comprising a nut socket, power means for rotating said nut socket about an axis, crimping means adjacent said nut socket and movable from an open position external of said socket to a closed position extending radially inwardly into said socket and a mechanism for causing movement of said crimping means from its open position radially inward to an intermediate position to clamp upon a nut within said socket while said nut is being rotated and effective to further move said clamping means to its said closed position to deform said nut after said nut has reached a predetermined tightness.

2. The tool of claim 1 wherein said mechanism for causing movement of said crimping means is a device effective to convert rotary motion of said tool as applied to said socket to radially inward movement of said crimping means.

3. The tool of claim 1 wherein said crimping means comprises a plurality of punches positioned radially adjacent the faces of said socket and movable from said open position outside said socket through the walls of said socket to said closed position within said socket.

4. The tool of claim 1 which further includes means for reversing the movement of said crimping means after reaching its said closed position effective to restore said crimping means to it said open position to release said crimped nut within said socket.

5. The tool of claim 1 wherein said mechanism for causing movement of said crimping means is a screw mechanism having one thread element rotated by said power means and the other thread element fixed to said socket whereby rotation of said socket is caused by rotation of both of said elements by said power means.

6. The tool of claim 5 wherein said crimping means is positioned within said screw mechanism such that relative movement of said screw elements parallel to said axis of rotation will cause movement of said crimping means between its said open and closed positions.

7. The tool of either of claims 5 or 6 said screw said-screw mechanism is a ball screw.

8. A tool for applying and locking a threaded nut upon a threaded bolt comprising a nut socket rotatable about an axis, crimping means radially adjacent said socket and movable from an open position external of said socket through an intermediate position to a closed position extending radially inwardly into said socket, a source of rotary power, and a drive mechanism for connecting said power source to said nut socket and crimping means effective to automatically and simultaneously rotate said socket and move said crimping means to its said intermediate position until said nut reaches a predetermined tightness and thence to automatically move said crimping means to its said closed position.

9. The tool of claim 8 wherein said drive mechanism comprises a screw mechanism having one race element driven by said source of rotary power about the axis of said nut socket, a second element secured relative to said socket and movable axially with respect to said first element when said elements rotate relative to each other about said axis, and means for converting the relative movement of said elements along said axis into a radially inward force upon said crimping means to move said crimping means to its said closed position when said nut reaches said predetermined tightness.

10. The tool of claim 9 where said screw mechanism is a ball screw.

11. The tool of claim 9 wherein said means for converting said relative movement includes a tapered surface on said elements which, when said elements move axially with respect to the other, exerts a radially inward force upon said crimping means to move it from said open to closed position.

12. The tool of claim 8 which further includes means for reversing said source of rotary power after said crimping means has reached its said closed position to thereby restore said crimping means to its said open position to release said crimped nut within said socket.

13. A tool for applying a threaded nut upon a threaded bolt by tightening it to a predetermined torque resistance and thence automatically locking it in place comprising a nut socket, a crimping means radially adjacent said nut socket and movable between an open position external of said socket to a closed position extending radially into said socket and control and power means operably connected to said socket and crimping means effective to simultaneously rotate said socket and move said crimping means partially towards its said closed position to grip a nut within said socket until said nut is tightened to the position of predetermined torque resistance and thence to cause said crimping means to automatically move to its said closed position to deform said nut and lock it in place at its position of tightness of predetermined torque resistance.

14. The tool of claim 13 wherein said control and power means is responsive to the torque encountered by said nut as it approaches its position of predetermined torque resistance and is effective to apply a gripping force upon said nut sufficient to prevent removal of said tool therefrom but insufficient to deform said nut prior to said nut reaching its position of predetermined torque resistance.

15. A method of applying a nut upon a threaded fastener to a predetermined tightness and then locking it in place by deforming the nut to create resistance against loosening with a driven rotary socket having at least one nut deforming punch adjacent said socket comprising the steps of 1 applying said socket upon said nut, 2 rotating said socket and thus said nut to an initial pretightening position, 3 continuing to rotate said socket and nut while applying a clamping force to the faces thereof with said punch sufficient to prevent removal of said nut from said socket but insufficient to deform said nut, 4 and thence deforming said nut by applying further clamping force thereon after said nut has reached said predetermined tightness.

* * * * *

UNITED STATES PATENT OFFICE
CERTIFICATE OF CORRECTION

Patent No. 3,758,938          Dated September 18, 1973

Inventor(s) Roger Cleary Simmons et al

It is certified that error appears in the above-identified patent and that said Letters Patent are hereby corrected as shown below:

Col. 4, line 23, "te" should be --the--

Col. 7, line 16, "it" should be --its--

Col. 7, line 29, insert --where-- after 6; same line "said screw" second occurrence should be deleted.

Signed and sealed this 26th day of February 1974.

(SEAL)
Attest:

EDWARD M. FLETCHER, JR.
Attesting Officer

C. MARSHALL DANN
Commissioner of Patents